United States Patent Office 3,053,269
Patented Sept. 11, 1962

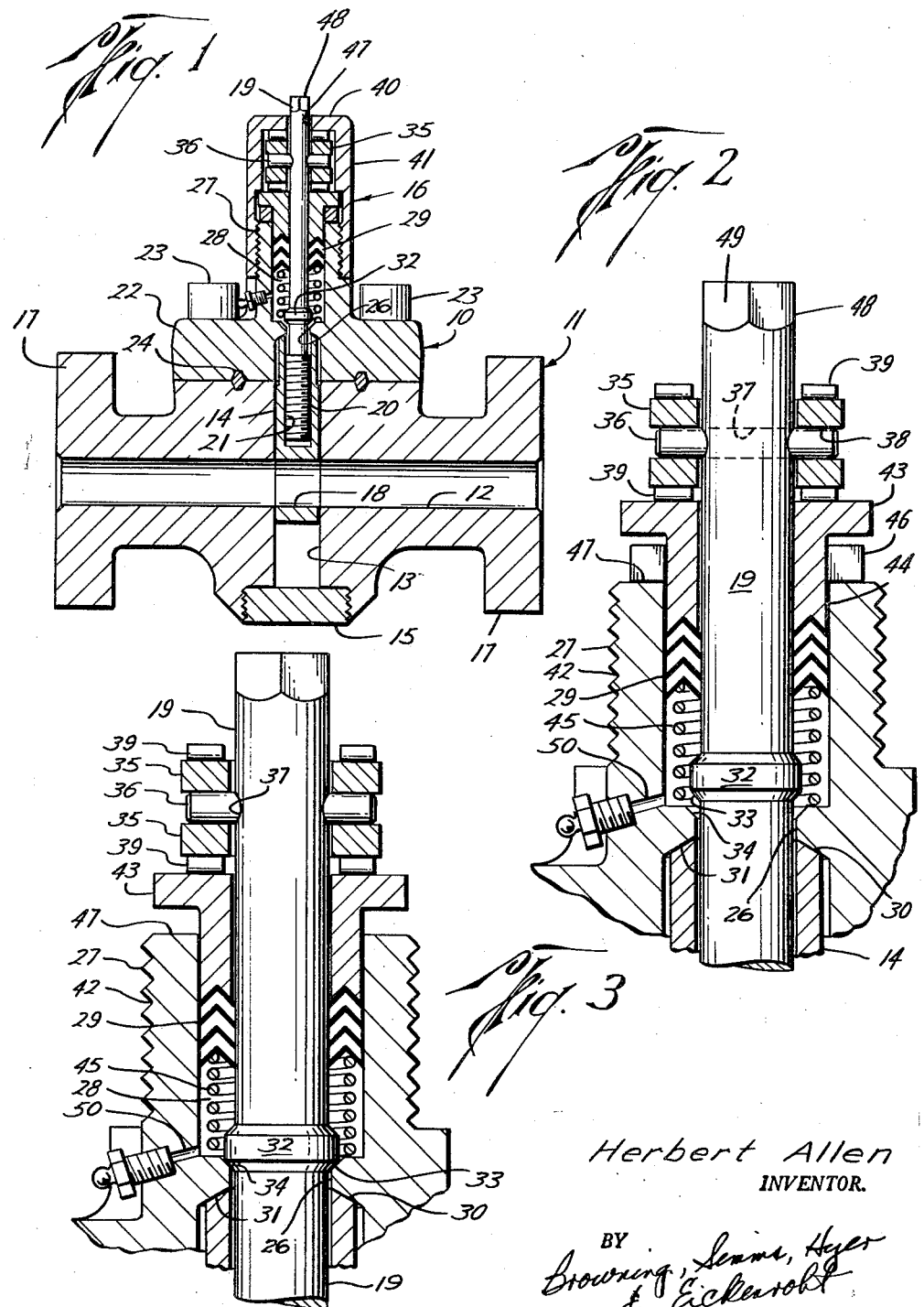

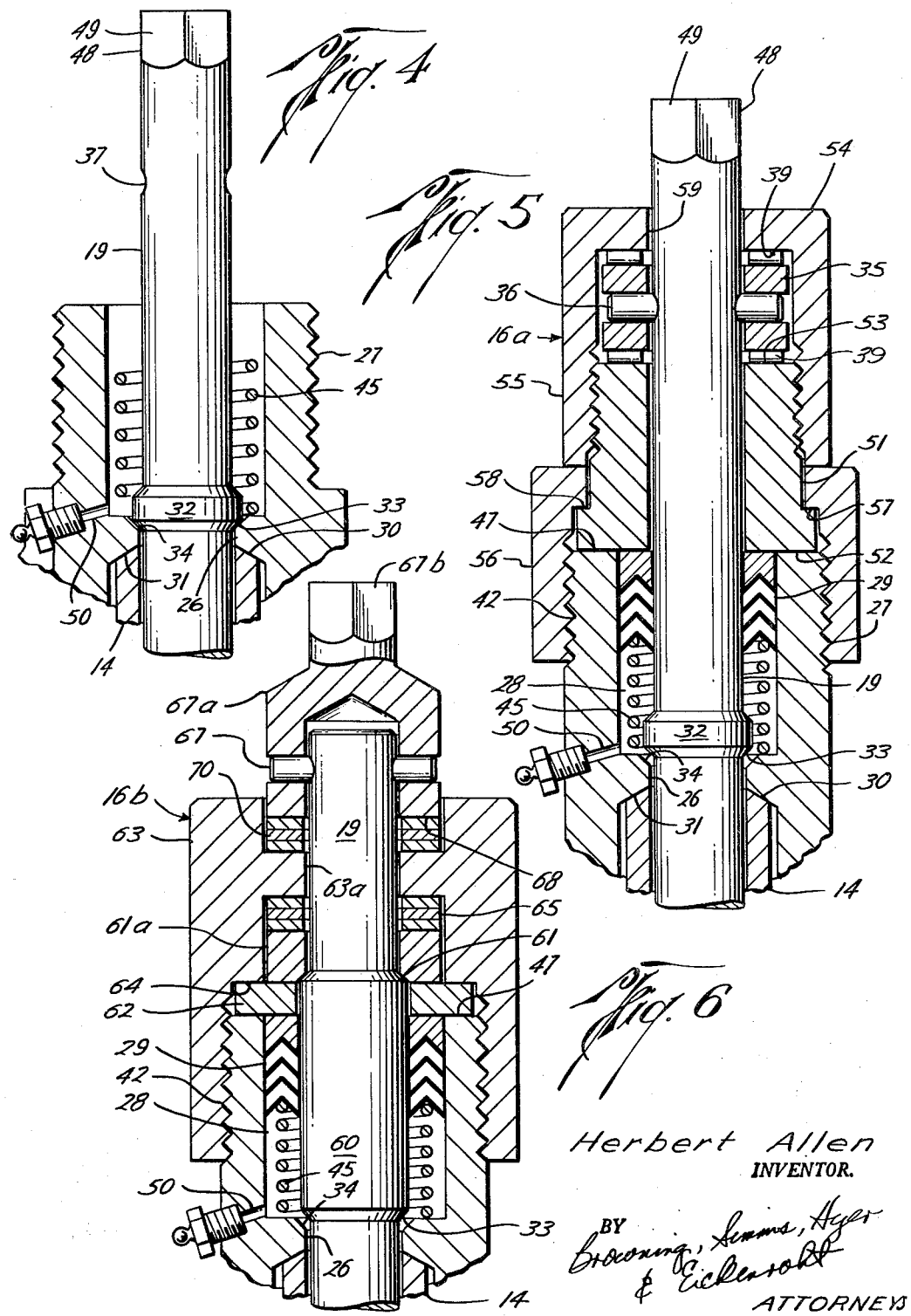

3,053,269
VALVE
Herbert Allen, Houston, Tex., assignor to Cameron Iron Works, Inc., Houston, Tex., a corporation of Texas
Filed Oct. 25, 1960, Ser. No. 64,893
16 Claims. (Cl. 137—315)

This invention relates in general to valves and, more particularly, to improved gate valves of the non-rising stem type.

In this type of valve, the stem is threadedly connected at its inner end to the gate and mounted at its outer end by a bonnet on the valve body which includes a bearing supporting the stem for rotation without longitudinal reciprocation. Thus, rotation of the stem causes the gate to slidably reciprocate within the body between closed and opened positions.

It is also conventional for the bonnet to carry packing for sealing about the stem in order to prevent the escape of fluid pressure from the body through the opening for the stem. It is often desirable to replace this packing, and possibly the bearing, while the valve is in use—i.e., without taking it out of the line. For this purpose, in several earlier valves of this type, the stem has an enlargement inwardly of the body opening which is normally spaced therefrom, but which is caused to back seat upon the body and close the opening upon closing of the gate and continued rotation of the stem.

There are many instances, however, in which it is either impossible or inconvenient to close the gate. Although several other prior valves of this type provide means for closing the body opening for the stem to permit replacement of the packing when the gate is open, they have serious shortcomings from other standpoints. For example, in many of these last-mentioned valves, the body opening is closed by a bearing on the stem seated on the body which increases the torque required in operating the valve. Other valves, such as the one shown in Dopp Patent No. 1,557,926, have not been practical because they do not permit the gate to be held open while the handwheel is removed, as a result of which it is impossible to replace the conventional annular packing over the end of the stem.

An object of this invention is to provide a non-rising stem type of gate valve in which the packing is replaceable in the open position of the gate without the shortcomings of these earlier valves; and, more particularly, in which the torque operating requirements are low and the packing is of the conventional annular type.

Another object is to provide such a valve which has a minimum number of parts and which enables the packing to be replaced with a minimum of time and effort.

A further object is to provide such a valve in which the bearing may be replaced separately of and without disturbing the packing.

These and other objects are accomplished by a non-rising stem gate valve in which the stem extends loosely through an opening in the body and is surrounded by annular packing which is retained for sealing between the stem and body outwardly of the opening, as in prior valves of this type. However, in accordance with the illustrated embodiments of this invention, the gate of this valve seats against the body in the limit of its opening movement, and the stem has an enlargement thereon outwardly of the body opening which is normally spaced from the body to permit the stem to turn easily. However, the stem enlargement is adapted to seat on the body and close said opening upon movement inwardly with respect thereto. When the stem enlargement and gate are so seated, so that they grip the body on opposite sides of the opening therein, the bearing as well as the packing may be removed from about the stem while maintaining the gate in its open position.

For this purpose, the means for so supporting the stem includes parts operable to first release the stem for such inward movement, while at the same time so retaining the packing in sealing relation between the stem and body. Then, when the opening is closed and while the body is gripped on opposite sides of the body opening in the manner above described, these parts are further operable to release the packing for replacement.

In the drawings, wherein like reference characters are used throughout to designate like parts:

FIG. 1 is a longitudinal sectional view of one embodiment of a valve constructed in accordance with the present invention, wherein the gate is in its open position and seated against the valve body and the enlargement on the stem is spaced above its seated position on the body of the valve;

FIG. 2 is a view of part of the bonnet of the valve of FIG. 1 on an enlarged scale and with the outer cap removed therefrom to permit the stem to be backed away from the body opening;

FIG. 3 is a view similar to FIG. 2, but wherein a ring has been removed from about the stem to permit it to be moved downwardly to seat its enlargement upon the valve body and close the opening therein;

FIG. 4 is a further view similar to FIGS. 2 and 3, but wherein the bearing and packing have been removed over the end of the stem;

FIG. 5 is a sectional view of the bonnet of another valve constructed in accordance with the present invention, wherein the gate is in its opened position and seated against the body and the enlargement on the stem is spaced above its seated position on the body, similarly to FIG. 1; and FIG. 6 is a sectional view of a bonnet of still another valve constructed in accordance with this invention, also in which the gate is open and seated on the body and the enlargement on the stem is spaced above seated position on the body.

With reference now to the details of the embodiment of the invention shown in FIGS. 1 to 4, the valve 10 includes a body 11 having a flowway 12 therethrough and a cavity 13 therein intersecting opposite sides of the flowway to receive a gate 14 slidably reciprocal therein for opening and closing the flowway. The lower end of the cavity 13 is closed by a plug 15, while the upper end thereof opens onto the top side of the body and is covered by a bonnet 16 on the body. The opposite ends of the body are provided with flanges 17 or other means for connecting it in the flow line.

The gate 14 is of the thru conduit type having a port 18 therein adapted to register with the flowway 12 to open the valve, when the gate is in the raised position of FIG. 1, and a solid portion above the opening 18 adapted to be disposed across the flowway to close same when the gate is lowered to move the port 18 into the lower end of the cavity 13. The gate 14 is reciprocated between opened and closed positions by means of a stem 19 which extends outwardly from the open side of the cavity for connection to the bonnet 16 and has its lower end 20 threadedly connected to a recess 21 extending longitudinally of the upper end of the gate. More particularly, and as will be described hereinafter, the stem 19 is of the non-rising type in that it is supported from the bonnet 16 for rotation about its longitudinal axis without longitudinal movement so that such rotation imparts the aforementioned longitudinal movement to the gate 14.

The valve body 11 includes an upper portion 22 removably connected to the remainder thereof by means of bolts 23 or the like and sealed with respect thereto by means of a seal ring 24 received in matching grooves about the cavity 13, all in a manner well known in the art. As shown in FIG. 1, the bonnet 16 can be replaced by disconnection of body portion 22 from the remainder of the body. The opening through this body portion is restricted at 26 about the stem 29 to separate the upper end of the cavity 13 from the lower end of an annulus 28 between the outer end of the stem and a hollow extension 27 of the body portion. As can be seen from FIG. 1, this extension and the annulus formed thereon provide an outward continuation of the restricted opening 26 in which Chevron type packing 29 is received to seal between the stem and body extension 27 against fluid pressure from within the valve body which passes outwardly through the restricted opening 26.

The upper end of the gate 14 has an annular tapered shoulder 30 about the stem 19 which seats in the open position of the gate upon a complementary surface 31 on the upper end of the cavity 25 inwardly of restricted opening 26. The stem 19 has an enlargement 32 thereon above or outwardly of the body opening 26 but below the packing 29, which enlargement is normally disposed in spaced relation to the body, as shown in FIG. 1, so as to minimize the torque requirements for rotating the stem. However, in a manner to be described hereinafter, an annular shoulder 33 on the lower side of the enlargement 32 is adapted to be seated upon a complementary annular surface 34 on the body outwardly of or above the opening 26. This seating of the enlargement not only supports the stem and the gate in its open position as the packing 29 is removed from the stem, but also closes the opening 26 against the passage of fluid pressure from within the valve body.

In this particular embodiment of the invention, the stem 19 is normally supported in the position of FIG. 1 for rotation without longitudinal movement by means of a bearing sleeve 35 connected to the upper end thereof by means of a pin 36 which, as indicated in FIG. 2, extends through an opening 37 in the pin as well as through aligned and diametrically opposed openings 38 in the sleeve 35. Needle bearings 39 are disposed on opposite sides of the sleeve 35, the upper of such bearings being held down by the top flange 40 of a cap 41 which encloses the bearing parts and is threadedly connected at 42 to the outer side of the body extension 27. The lower needle bearings are, on the other hand, held between the lower side of the bearing sleeve 35 and the upper flange 43 of a sleeve 44 having its reduced lower end extending into the upper end of the annulus 28 to hold down the Chevron packing 29. A coil spring 45 disposed within the annulus 28 beneath the packing and resting upon the valve body above the opening 26 forces the Chevron packing tightly against the sleeve 44 to maintain it in sealing relation between the stem and body.

The flange 43 is supported on its lower side by means of a diametrically split ring 46 disposed about the lower extension of the sleeve 44 on the upper end 47 of extension 27. Thus, the ring 46 supports the flange 43 of the sleeve which holds the packing 29 down, while the flange 43 in turn supports the stem bearing in a position to maintain shoulder 33 on enlargement 32 spaced above the complementary seating surface 34 on the outer side of the body opening 26. This flange and thus the spaced ring 46 are held down by the stem bearing which, as previously noted, is held down by the reasonable connection of the cap 41 to the extension 27. As shown in FIG. 1, the upper end of the cap 41 has an opening 47 therethrough surrounding the upper end 48 of the stem which has a non-circular part 49 or other means connectable to a suitable tool for imparting rotation thereto.

When the gate 14 has been moved to the open position shown in FIG. 1, and it is desired to replace the packing 29 without the loss of pressure from within the valve body, the cap 41 is first removed axially over the end of the stem 19, as shown in FIG. 2. At this time, the enlargement 32 is backed away or outwardly from the position shown in FIG. 1 by rotation of the stem in a direction opposite to that in which it is rotated to open the gate. That is, for example, if the stem 19 is rotated in a left-hand direction to move the gate to the open position shown in FIG. 1, it is, upon removal of the cap 41, rotated in a right-hand direction to raise the enlargement a short distance to the position shown in FIG. 2. This, in turn, permits the flange 43 to be raised a slight distance above the split spacer ring 46 so that the ring may be moved radially outwardly between the flange and upper end 47 of the body extension.

This spacer ring 46 has a thickness or dimension axially of the stem 19 which is greater than the spacing of the seat 33 on the enlargement above the seating surface 34 on the valve body in the supported position of the stem shown in FIG. 1. Thus, removal of the spacer releases the stem bearing for movement downwardly a distance sufficient to seat stem shoulder 33 upon body surface 34 when the stem is rotated in the direction for opening the gate—i.e., in the left-hand direction in the example previously mentioned. When the stem has been so moved, as shown in FIG. 3, the enlargement 32 not only supports the stem against further inward movement which would move the gate from its open position but also closes off the opening 26. During this time, however, the sleeve 44 has been held down by the pin 36 in its position for retaining the packing in sealing relation between the stem and body.

The fluid pressure within the annulus 28 is now bled off through port 50, and the pin 36 is removed from its position connecting the bearing sleeve 35 to the stem 19. Upon this removal of the pin, the bearing sleeve together with the needle bearings 39 may be moved axially upwardly over the end of the stem, which in turn releases the packing retaining sleeve 44 for movement upwardly from its position holding the packing 29 down and over the end of the stem. The annular Chevron packing is then free to be moved axially over the stem for replacement or repair, as might be desired.

Upon replacement of the packing 29 and closing off the bleed port 50 in the reassembly of the bonnet structure 16, the sleeve 44 is first moved downwardly over the stem and against the packing, and the bearing sleeve 35 and needle bearings 39 then moved over the stem so that the pin 36 may be inserted into its position for releasably connecting the sleeve 35 to the stem. At this time, the stem is rotated to back the enlargement 32 away from the position of FIG. 3 a distance sufficient, such as shown in FIG. 2, to permit the split ring 46 to be disposed between the flange 43 and upper side 47 of the extension 27. Then, the rotation of the stem is reversed to move the flange 43 downwardly onto the top side of the split ring 46, at which time the cap 41 can be threaded over the hollow extension 27.

Turning now to the embodiments of the invention shown in FIGS. 5 and 6, it will be understood that the construction of the valve in general may be the same as that above described in connection with FIGS. 1 to 4, as indicated by identical reference characters. Also, in the FIG. 5 embodiment, as in the FIGS. 1 to 4 embodiment, the stem 19 has an enlargement 32 thereon and is surrounded by a bearing sleeve 35 which is removably pinned thereto at 36. Still further, needle bearings 39 are disposed on the upper and lower sides of the sleeve 35.

However, as distinguished from the embodiment of the invention described in connection with FIGS. 1 to 4, the bonnet 16a shown in FIG. 5 includes an integral ring 51 having the outer portion of its lower end 52 seatable on the upper end of body extension 47 and the inner portion thereof bearing upon the Chevron packing 29 to hold it down within the annulus 28 and against the upwardly directed force of the coil spring 45. The lower needle bearing 39 is supported on the upper side 53 of the ring 51, while the upper needle bearing 39 is held down by the top flange 54 on an upper cap 55 threadedly connected about its lower end to the upper outer end of the packing hold-down ring 51. This latter ring is, in turn, held down on the upper end 47 of the extension 27 by means of a lower cap 56 having an inner flange 57 seatable on an outer flange 58 on the hold-down ring 51 and threadedly connected about its lower end to the threads 42 on extension 27.

Thus, in this particular embodiment of the invention, the ring 51 which is held down by the lower cap 56 serves in turn to hold down the packing 29. Then, the bearing sleeve 35 and needle bearings 39 are held down upon the hold-down ring 51 by means of an upper cap 55 which is threadedly connected to such packing retaining ring. As in the case of the cap 41 of the embodiment of FIGS. 1 to 4, the top flange 54 is provided with an opening 59 therethrough to receive the upper end 48 of the stem 19 having a part 49 to which a suitable tool may be connected for imparting rotation to the stem.

With the parts of this embodiment disposed in the position of FIG. 5, wherein the gate 14 is in an open position seated against the body as shown in FIG. 1, and the shoulder 33 on the enlargement 32 is spaced above its seated position on the outer side of the body opening, the upper cap 55 may first be removed axially over the outer end of the stem to permit removal and replacement of the bearing parts 35 and 39. It will be noted, in this respect, that even upon removal of the cap 55, the cap 56 and ring 51 will hold the packing 29 in sealing relation between the stem and body so that the bearings may be replaced, if desired, without replacement of the packing.

This removal of the upper cap 55 and disconnection of the bearing parts from the stem by removal of the pin 36 frees the stem 19 for inward movement with respect to the body opening 26 upon rotation of the stem in the direction it is rotated to open the gate. When the enlargement 32 has been so seated and the body opening 26 closed, the bleed port 50 may be opened and the upper cap 56 removed from the body extension 27 to release the packing hold-down ring 51 for removal. When the latter ring has been removed upwardly over the outer end of the stem, the packing 29 may be similarly removed for replacement as desired.

Upon reassembly of this embodiment of the invention, and upon replacement of the packing and closing of the bleed port, the hold-down ring 51 is first moved over the stem and then held down to retain the packing by connection of the lower cap 56 to the body extension 27. At this time, the stem 19 may be backed out to a position permitting reassembly of the bearing parts 35 and 38 in the manner shown in FIG. 5, after which the upper cap 55 may be reconnected to the hold-down ring 51 for holding the upper needle bearings 39 and enclosing the remaining portions of the bonnet structure.

In the embodiment of the invention shown in FIG. 6, the stem shoulder 33 for seating on the complementary surface 34 of the body on the outer side of body opening 26 is provided on the lower end of a longitudinal extending enlargement 60, which also has an oppositely facing shoulder 61 at its upper end for a purpose to be described. As shown in FIG. 6, Chevron packing 29 within the annulus 28 is held down in sealing engagement between this enlargement on the stem and the inside of the hollow extension 27 of the body by the inner portion of a ring 62 whose outer portion is seated upon the upper end 47 of the body extension.

This ring 62 is in turn held down by an inner shoulder 64 on the cap 63 which is threadedly connected at its lower end to the threaded portion 42 on the upper end of the body extension 27. The upper shoulder 61 on the stem enlargement 60 forms an upwardly facing bearing surface thereon which is held down by a bearing ring 61a disposed thereabove within the cap 63. This latter ring is, in turn, held down by bearings in the form of thrust washers 65 disposed beneath an inner flange 63a on the cap 63. A pin 67 releasably connects a sleeve 67a having an actuating part 67b on its upper end to the stem to hold the lower end 68 of the sleeve down upon thrust washers 70 which rest upon the upper side of the inner flange 63a of the cap 63.

With the parts assembled in the manner shown in FIG. 6 and described above, and with the gate 14 in the open position to seat on the body, the pin 67 is first removed to permit the sleeve 67a and upper washers 70 to be moved axially over the upper end of the stem 19. Removal of this pin also releases the stem for movement downwardly or inwardly with respect to the opening 26 so as to seat shoulder 33 upon seating surface 34 as the stem is rotated in the direction it was rotated to open the gate. When the stem enlargement is so seated and the body opening 26 is thereby closed, the bleed port 50 is opened so that the cap 63 may be removed over the stem to release the lower washers 65 and bearing ring 61a for removal axially over the outer end of the stem. This in turn permits axial removal of the hold-down ring 62 to release the packing 29 for removal and replacement over the upper end of the stem.

Upon replacement of the packing 29 and closing of the bleed port 50, the hold-down ring 62 is first moved into place to retain the packing and the cap 63 then threaded to the body extension 27 over the washers 65 and bearing ring 61a. At this time, the stem is backed away from the position in which its shoulder 33 seats upon the seating surface 34 of the valve body to permit the upper washers 70 to be seated upon the flange 67 of the cap 63 and the sleeve 67a to be reassembled on the upper end of the stem by means of the pin 67. When the parts are so assembled, the thrust washers 65 and 70 are enclosed by the cap.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a valve, comprising a body having a flowway therethrough, a stem extending loosely through an opening in the body and having its outer end supported from the body for rotation and held against longitudinal movement toward and away from the opening, a gate threadedly connected to the inner end of the stem and slidably mounted in the body for longitudinal movement, in response to stem rotation, toward the body opening to open the flowway and away from said opening to close the flowway, and packing retained in sealing relation between the stem and body outwardly of the body opening to prevent the escape of fluid pressure passing through said opening from within the valve body, the improvement which comprises a shoulder on the gate seatable on the body to limit opening movement of the gate, means on the stem outwardly of the opening which is spaced from said opening in the supported position of the stem but adapted to seat upon the body and close said opening when moved inwardly with respect thereto, and means for releasing the stem for movement, in response to its rotation, inwardly toward the body opening to seat said last-mentioned means and close said opening, while retaining the packing in sealing relation, and then releasing said packing for removal and replacement from between the stem and body.

2. A valve, comprising a body having a flowway therethrough, a stem extending loosely through an opening in the body, a gate threadedly connected to the inner end of the stem and slidably mounted in the body for movement toward the body opening to open the flowway and away from said opening to close the flowway, packing sealing between the stem and body outwardly of the body opening to prevent the escape of fluid pressure passing through said opening from within the valve body, said gate being seatable against the body on the inner side of the body opening in the open position of the gate to prevent further opening movement thereof, an enlargement on the stem adapted to seat on the body on the outer side of the body opening and close said opening to prevent the passage of fluid pressure therethrough, and means retaining the packing in sealing relation between the stem and body and rotatably supporting the stem against longitudinal movement toward and away from said opening and with the stem enlargement spaced from the body, whereby the gate is moved between opened and closed positions upon rotation of the stem, said stem supporting and packing retaining means including means for releasing the stem for movement upon rotation thereof inwardly toward the body opening to seat its enlargement upon the body and close said opening, while retaining the packing in said sealing relation, and then releasing said packing for removal and replacement from between the stem and body.

3. A valve, comprising a body having a flowway therethrough, a stem extending loosely through an opening in the body, a gate threadedly connected to the inner end of the stem and slidably mounted in the body for movement toward the body opening to open the flowway and away from said opening to close the flowway, packing sealing between the stem and body outwardly of the body opening to prevent the escape of fluid pressure passing through said opening from within the valve body, means rotatably supporting the stem against longitudinal movement toward and away from said opening, whereby the gate is moved between opened and closed positions upon rotation of the stem, and retaining the packing in sealing relation between the stem and body, a shoulder on the gate seatable on the body to limit opening movement of the gate, and an enlargement on the stem outwardly of the body opening and spaced from the body in its supported position and adapted to close said opening upon movement inwardly toward said opening to seat on the body, said supporting means including a part operable to render it ineffective to support the stem against inward movement, while maintaining the packing in its sealing relation, when the gate is open and the stem is rotated to seat its enlargement on the body and close the body opening, and another part operable to permit removal of the packing for replacement when said opening is closed.

4. A valve of the character defined in claim 3, wherein said first-mentioned part is movable to a position permitting inward movement of the stem with respect to the remainder of the supporting means.

5. A valve of the character defined in claim 3, wherein said first-mentioned part is movable to a position permitting inward movement of the remainder of the supporting means with respect to the body.

6. A valve, comprising a body having a flowway therethrough, a stem extending loosely through an opening in the body, a gate threadedly connected to the inner end of the stem and slidably mounted in the body for movement toward the body opening to open the flowway and away from said opening to close the flowway, packing in an annulus between the body and the outer portion of the stem which forms an extension of the body opening, means on the body for retaining the packing in the annulus in sealing relation between the body and stem and supporting the stem for rotation about its longitudinal axis and against movement longitudinally toward and away from the body opening, so that rotation of the stem moves the gate between opened and closed positions, a shoulder on the gate seatable on the body to limit opening movement of the gate, and an enlargement on the stem outwardly of the body opening and spaced from the body in its supported position and adapted to close said opening upon movement inwardly toward said opening to seat on the body, said packing retaining and stem supporting means including a first part movable to a position rendering it ineffective to support the stem against inward movement for a distance at least as great as the spacing of the stem enlargement from body seating position, whereby, when the gate is open, the stem may be rotated to seat the enlargement on the body and close the body opening, and said means also including a second part which continues to so retain the packing upon movement of the first part and seating of the stem enlargement and is then movable to a position releasing the packing for removal from the annulus and replacement while said body opening is closed by the stem enlargement.

7. A valve of the character defined in claim 6, wherein said first-mentioned part releasably connects the stem to the packing retaining and stem supporting means, and said second part releasably connects the remainder of said means to the body.

8. A valve of the character defined in claim 6, wherein said first-mentioned part comprises a spacer between the body and remainder of the packing retaining and stem supporting means, and said second part releasably connects the stem to said means.

9. A valve, comprising a body having a flowway therethrough, a stem extending loosely through an opening in the body and having a shoulder thereon outwardly of and facing toward the opening for closing said opening when seated on the body, a gate threadedly connected to the inner end of the stem and slidably mounted in the body for movement toward the body opening to open the flowway and away from the body opening to close the flowway, said body having a hollow extension forming an outward continuation of the body opening and an annulus about the stem, annular packing in the annulus for sealing thereacross to contain fluid pressure from the valve body which passes through the opening, said gate having a shoulder facing the body opening and seatable on the body to limit opening movement of the gate, and means including bearing parts on the body rotatably supporting the stem against longitudinal movement toward and away from said opening and with the stem enlargement spaced outwardly from its seated position on the body, whereby the gate is moved between opened and closed positions upon rotation of the stem, one of said bearing parts being movable to a position rendering the stem supporting means ineffective to support the stem against inward movement for a distance at least as great as the spacing of the stem shoulder from body seating position so that, upon opening of the gate, the stem may be rotated to seat the shoulder on the body and close the body opening, and another of said bearing parts retaining the packing in sealing position, upon movement of the first bearing part and seating of the shoulder on the body, and then being movable to a position releasing the packing for removal from the annulus and replacement while said body opening is closed by the stem shoulder.

10. A valve, comprising a body having a flowway therethrough, a stem extending loosely through an opening in the body and having a shoulder thereon outwardly of and facing toward the opening for closing said opening when seated on the body, a gate threadedly connected to the inner end of the stem and slidably mounted in the body for movement toward the body opening to open the flowway and away from the body opening to close the flowway, said body having a hollow extension forming an outward continuation of the body opening and an annulus about the stem, annular packing in the annulus for sealing thereacross to contain fluid pressure from the valve body which passes through the opening, said gate being seatable on the body to limit opening movement of the gate, bearing means having inwardly and outwardly facing bearing surfaces connected on the stem, means including a ring about the stem and disposed between the inwardly facing bearing surface and the packing to support the stem shoulder outwardly of its seated position on the body and retain the packing in the annulus, and means including a cap releasably connected to the body for holding the outwardly facing bearing surface down, whereby the stem is held against longitudinal movement with respect to the body opening, so that the gate is moved between opened and closed positions upon rotation of the stem, one of said ring and the inwardly facing bearing surface being movable to a position permitting the stem shoulder to be moved into body seating position upon rotation of the stem, and the other of said ring and the inwardly facing bearing surface being movable to a position permitting said packing to be removed from the annulus.

11. A valve of the character defined in claim 10, wherein said bearing means includes a sleeve about the stem and a pin extending through the stem and sleeve for removal therefrom to permit the bearing sleeve, the stem shoulder supporting ring, and the annular packing to be moved axially over the end of the stem upon release and removal of the cap from the body.

12. A valve of the character defined in claim 10, wherein said ring is split for removal from about the stem between the body and inwardly facing bearing surface.

13. A valve of the character defined in claim 12, wherein said cap has a top flange which holds the bearing means down and side walls which cover said bearing means and stem shoulder supporting means.

14. A valve of the character defined in claim 10, wherein said cap has a flange thereon for holding said stem shoulder supporting ring down independently of the inward facing bearing surface.

15. A valve of the character defined in claim 14, wherein said holding means includes another cap releasably connected to the first-mentioned cap and having a top flange holding said bearing means down.

16. A valve of the character defined in claim 14, wherein said cap has another flange thereon for holding down the outwardly facing bearing surface.

References Cited in the file of this patent
UNITED STATES PATENTS

| | | |
|---|---|---|
| 1,625,698 | Barton | Apr. 19, 1927 |
| 1,790,363 | Atterbury | Jan. 27, 1931 |
| 1,954,643 | Neuhaus | Apr. 10, 1934 |